US012781960B2

(12) United States Patent
Seeley et al.

(10) Patent No.: US 12,781,960 B2
(45) Date of Patent: Nov. 3, 2026

(54) ABATEMENT APPARATUS

(71) Applicant: Edwards Limited, Burgess Hill (GB)

(72) Inventors: Andrew James Seeley, Clevedon (GB); David Frederick Bartz, San Jose, CA (US); Michael Jay Silberstein, San Jose, CA (US)

(73) Assignee: Edwards Limited, Burgess Hill (GB)

(*) Notice: Subject to any disclaimer, the term of this patent is extended or adjusted under 35 U.S.C. 154(b) by 383 days.

(21) Appl. No.: 18/578,171

(22) PCT Filed: Jul. 7, 2022

(86) PCT No.: PCT/GB2022/051744
§ 371 (c)(1),
(2) Date: Jan. 10, 2024

(87) PCT Pub. No.: WO2023/285778
PCT Pub. Date: Jan. 19, 2023

(65) Prior Publication Data

US 2024/0318817 A1 Sep. 26, 2024

(30) Foreign Application Priority Data

Jul. 13, 2021 (GB) ..................................... 2110047

(51) Int. Cl.
*F23G 7/06* (2006.01)
*B01D 53/70* (2006.01)
(Continued)

(52) U.S. Cl.
CPC ............. *F23G 7/065* (2013.01); *B01D 53/70* (2013.01); *F23C 3/002* (2013.01); *F23D 14/145* (2013.01);
(Continued)

(58) Field of Classification Search
CPC ................................ F23D 14/58; F23G 7/065
(Continued)

(56) References Cited

U.S. PATENT DOCUMENTS 4,532,914 A 8/1985 Thomas et al.
4,764,105 A 8/1988 McElroy
(Continued)

FOREIGN PATENT DOCUMENTS

CA 2629127 C 2/2011
CN 2487438 Y 4/2002
(Continued)

OTHER PUBLICATIONS

Japanese Notification of Reason for Rejection dated Feb. 17, 2025 for corresponding Japanese application Serial No. 2024-501172, 7 pages.
(Continued)

*Primary Examiner* — Vivek K Shirsat
(74) *Attorney, Agent, or Firm* — Theodore M. Magee; Westman, Champlin & Koehler, P.A.

(57) ABSTRACT

An abatement apparatus includes a combustion chamber formed by a foraminous sleeve defining an upstream portion of the combustion chamber for treating an effluent stream, the upstream portion of the combustion chamber having an inlet for receiving the effluent stream and a wetted sleeve fluidly coupled with foraminous sleeve, the wetted sleeve defining a downstream portion of the combustion chamber, wherein the foraminous sleeve is configured to provide a foraminous axial surface facing downstream towards the downstream portion of the combustion chamber. In this way, the foraminous surface not only faces inwards towards the upstream portion of the combustion chamber, but also faces downstream, towards the downstream portion of the combustion chamber.

15 Claims, 2 Drawing Sheets

(51) Int. Cl.
*F23C 3/00* (2006.01)
*F23D 14/14* (2006.01)
*F23J 15/04* (2006.01)

(52) U.S. Cl.
CPC ....... *F23J 15/04* (2013.01); *B01D 2257/2066* (2013.01); *B01D 2258/0216* (2013.01); *F23G 2209/142* (2013.01); *F23J 2219/40* (2013.01)

(58) Field of Classification Search
USPC ........................................................ 431/187, 5
See application file for complete search history.

(56) References Cited

U.S. PATENT DOCUMENTS

| | | | |
|---|---|---|---|
| 5,603,905 A | 2/1997 | Bartz et al. | |
| 6,234,787 B1 | 5/2001 | Endoh et al. | |
| 7,892,506 B2 * | 2/2011 | Seeley | F23D 14/16 423/240 R |
| 8,293,184 B2 | 10/2012 | Moore | |
| 10,161,628 B2 | 12/2018 | Seeley | |
| 12,516,811 B2 | 1/2026 | Jones et al. | |
| 2005/0135984 A1 | 6/2005 | Ferron et al. | |
| 2007/0217983 A1 | 9/2007 | Stanton et al. | |
| 2010/0116140 A1 | 5/2010 | Arai et al. | |
| 2013/0287637 A1 | 10/2013 | Vickery | |
| 2013/0305970 A1 | 11/2013 | Kim | |
| 2014/0106282 A1 | 4/2014 | Kim et al. | |
| 2016/0076769 A1 | 3/2016 | Stanton et al. | |
| 2016/0169508 A1 | 6/2016 | Bell | |
| 2017/0144092 A1 | 5/2017 | Seeley | |
| 2020/0030828 A1 | 1/2020 | Seeley et al. | |
| 2020/0038796 A1 | 2/2020 | Fekety et al. | |
| 2021/0057236 A1 | 2/2021 | Sekine et al. | |
| 2022/0016572 A1 | 1/2022 | Lampert | |
| 2022/0373175 A1 | 11/2022 | Price et al. | |

FOREIGN PATENT DOCUMENTS

| | | | |
|---|---|---|---|
| CN | 1993170 | A | 7/2007 |
| CN | 105408689 | A | 3/2016 |
| CN | 206240259 | U | 6/2017 |
| CN | 107850299 | A | 3/2018 |
| CN | 108019774 | A | 5/2018 |
| CN | 108291716 | A | 7/2018 |
| CN | 108715436 | A | 10/2018 |
| CN | 213159427 | U | 5/2021 |
| EP | 0694735 | A1 | 1/1996 |
| EP | 1129763 | A1 | 9/2001 |
| EP | 2079961 | B1 | 12/2015 |
| GB | 2550382 | A | 11/2017 |
| GB | 2584675 | A | 12/2020 |
| JP | S58184421 | U | 12/1983 |
| JP | H1054534 | A | 2/1998 |
| JP | H10148309 | A | 6/1998 |
| JP | 2005522660 | A | 7/2005 |
| JP | 2006170603 | A | 6/2006 |
| JP | 2008519959 | A | 12/2008 |
| JP | 2016011759 | A | 1/2016 |
| JP | 2017211100 | A | 11/2017 |
| JP | 2021502518 | A | 1/2021 |
| TW | 201138931 | A | 11/2011 |
| TW | 201418629 | A | 5/2014 |
| WO | 0161245 | A1 | 8/2001 |
| WO | 2007053626 | A2 | 5/2007 |
| WO | 2008122819 | A1 | 10/2008 |
| WO | 2010054291 | A1 | 5/2010 |
| WO | 2016156811 | A1 | 10/2016 |
| WO | 2017037419 | A1 | 3/2017 |
| WO | 2018129111 | A1 | 7/2018 |
| WO | 2023285779 | A1 | 1/2023 |
| WO | 2023285780 | A1 | 1/2023 |
| WO | 2023285781 | A1 | 1/2023 |

OTHER PUBLICATIONS

Japanese Notification of Reason for Rejection dated Feb. 27, 2025 for corresponding Japanese application Serial No. 2024-501522, 9 pages.
Japanese Notification of Reason for Rejection dated Mar. 24, 2025 for corresponding Japanese application Serial No. 2024-501521, 7 pages.
British Examination Report dated Apr. 27, 2022 and Search Report dated Apr. 12, 2022 for corresponding British Application No. GB2110048.2, 9 pages.
PCT Notification of Transmittal of the International Search Report and the Written Opinion of the International Searching Authority, or the Declaration and PCT Search Report dated Sep. 21, 2022 for corresponding PCT application Serial No. PCT/GB2022/051745, 11 pages.
British Examination Report dated Apr. 8, 2022 and Search Report dated Apr. 1, 2022 for corresponding British Application No. GB2110049.0, 10 pages.
PCT Notification of Transmittal of the International Search Report and the Written Opinion of the International Searching Authority, or the Declaration and PCT Search Report dated Sep. 21, 2022 for corresponding PCT application Serial No. PCT/GB2022/051746, 11 pages.
British Examination Report dated Apr. 27, 2022 and Search Report dated Apr. 12, 2022 for corresponding British Application No. GB2110051.6, 11 pages.
PCT Notification of Transmittal of the International Search Report and the Written Opinion of the International Searching Authority, or the Declaration and PCT Search Report dated Sep. 28, 2022 for corresponding PCT application Serial No. PCT/GB2022/051747, 12 pages.
British Examination Report dated Apr. 8, 2022 and Search Report dated Apr. 6, 2022 for corresponding British Application No. GB2110047.4, 10 pages.
PCT Notification of Transmittal of the International Search Report and the Written Opinion of the International Searching Authority, or the Declaration and PCT Search Report dated Sep. 21, 2022 for corresponding PCT application Serial No. PCT/GB2022/051744, 11 pages.
Notice of Allowance dated Jun. 2, 2026 for U.S. Appl. No. 18/577,018, Amendment dated Jun. 17, 2026 and Office Action dated Mar. 23, 2026 for U.S. Appl. No. 18/577,018 and Amendment dated Jul. 2, 2026 and Office Action dated Apr. 7, 2026 for U.S. Appl. No. 18/577,018, 107 pages.
Chinese Search Report dated Apr. 15, 2026 and Office Action dated Apr. 16, 2026 for Chinese application No. 202280049687.0, Chinese Search Report dated Apr. 14, 2026 and Office Action dated Apr. 15, 2026 for Chinese application No. 202280049686.6, Chinese Search Report dated Mar. 19, 2026 and Office Action dated Mar. 25, 2026 for Chinese application No. 202280049674.3, 32 pages.
Taiwanese Search Report dated Apr. 2, 2026 and Office Action dated Apr. 8, 2026 for Taiwanese application No. 111125527, Taiwanese Search Report dated for Taiwanese application No. 111125451, 14 pages.

* cited by examiner

ABATEMENT APPARATUS

CROSS-REFERENCE OF RELATED APPLICATION

This application is a Section 371 National Stage Application of International Application No. PCT/GB2022/051744, filed Jul. 7, 2022, and published as WO 2023/285778A1 on Jan. 19, 2023, the content of which is hereby incorporated by reference in its entirety and which claims priority of British Application No. 2110047.4, filed Jul. 13, 2021.

FIELD

The field of the invention relates to an abatement apparatus and a method.

BACKGROUND

Abatement apparatus, such as radiant burners or other types of abatement apparatus, are known and are typically used for treating an effluent gas stream from a manufacturing processing tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known radiant burners use combustion to remove the PFCs and other compounds from the effluent gas stream, such as that described in EP 0 694 735. Typically, the effluent gas stream is a nitrogen stream containing PFCs and other compounds. The effluent stream is conveyed into a combustion chamber that is laterally surrounded by the exit surface of a foraminous gas burner. In some cases treatment materials, such as fuel gas, can be mixed with the effluent gas stream before entering the combustion chamber. Fuel gas and air are simultaneously supplied to the foraminous burner to affect combustion at the exit surface. The products of combustion from the foraminous burner react with the effluent stream mixture to combust compounds in the effluent stream.

Although arrangements of abatement apparatus exist, they each have their own shortcomings. Accordingly, it is desired to provide an improved arrangement for abatement apparatus.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided an abatement apparatus for abatement of an effluent stream from a semiconductor processing tool, comprising: a combustion chamber formed by a foraminous sleeve defining an upstream portion of the combustion chamber for treating the effluent stream, the upstream portion of the combustion chamber having an inlet for receiving the effluent stream and a wetted sleeve fluidly coupled with foraminous sleeve, the wetted sleeve defining a downstream portion of the combustion chamber, wherein the foraminous sleeve is configured to provide a foraminous axial surface facing downstream towards the downstream portion of the combustion chamber.

The first aspect recognises that a problem with existing combustion chambers having a foraminous sleeve is that particulates, powder or condensates can form or be deposited, particularly at an interface between the foraminous sleeve and a downstream wetted sleeve. This is because the wetted sleeve cools the surface of a discharge region of the foraminous sleeve and, in addition, the fluid exiting the foraminous sleeve which can help to prevent the accumulation of particulate particulates, powder or condensates only occurs radially, which results in the accumulation of particulates, powder or condensates within the treated effluent stream at this discharge region which can cause bridging or blockages by that accumulated material. Also, it is difficult to abut the wetted sleeve against the foraminous sleeve to help avoid the exposing the surface of the discharge region of the foraminous sleeve since the fluid from the wetted sleeve could wick undesirably into the foraminous sleeve or if a separating gasket is used, then that gasket can likewise cause accumulation of particulate particulates, powder or condensates thereon. Accordingly, an abatement apparatus is provided. The abatement apparatus may be for the abatement of an effluent stream. The effluent stream may be from a semiconductor processing tool. The abatement apparatus may comprise a combustion chamber. The combustion chamber may be formed by a foraminous sleeve and a wetted sleeve. The foraminous sleeve may define an upstream portion of the combustion chamber for treating the effluent stream. The upstream portion of the combustion chamber may have an inlet for receiving the effluent stream. The wetted sleeve may be fluidly coupled with the foraminous sleeve. The wetted sleeve may define a downstream portion of the combustion chamber. The foraminous sleeve may be configured, shaped or arranged to provide a foraminous axial surface facing downstream towards the downstream portion of the combustion chamber. In this way, the foraminous surface not only faces inwards towards the upstream portion of the combustion chamber, but also faces downstream, towards the downstream portion of the combustion chamber. This facilitates combustion on the surface of the foraminous sleeve, both towards the upstream portion of the combustion chamber and towards the downstream portion of the combustion chamber. This helps to maintain the temperature in the vicinity of the discharge region of the foraminous sleeve, provides a fluid flow (which provides a purge) in this region and avoids needing to abut the foraminous sleeve and wetted sleeve, which helps to prevent condensation of particulate matter occurring in this region and helps to prevent the build-up of particulates, powder or condensates that may cause bridging or blockages.

The foraminous axial surface may be orthogonal or transverse to the wetted sleeve.

The foraminous sleeve may have at least one inward-facing surface defining the upstream portion of the combustion chamber. The foraminous axial surface may at least partially define an upstream portion outlet.

At least a portion of the foraminous axial surface may be orthogonal or transverse to the inward-facing surface.

The inward-facing surface may be orientated to be generally parallel to a major direction of flow of the effluent stream in or through the combustion chamber. At least a portion of the foraminous axial surface may be orientated to be generally orthogonal or transverse to the major direction of flow of the effluent stream.

The inward-facing surface and the foraminous axial surface may have a lofted transition. This helps to reduce the presence of any discontinuities which may otherwise interfere with the flow of the effluent stream and/or act as a trap for particulates, powder or condensates.

The foraminous axial surface may be planar and/or curved.

The combustion chamber may be tubular. It will be appreciated that such a tubular combustion chamber need not be cylindrical but may be other tubular shapes.

The combustion chamber may be cylindrical and the foraminous axial surface may be annular.

The combustion chamber may be cuboid. The foraminous axial surface may be an annular quadrilateral.

The foraminous sleeve may be at least partially housed within a radially outer sleeve extending at least partially along an axial length of the foraminous sleeve to define a plenum for delivery of combustion materials to be conveyed or provided through the foraminous sleeve for combustion thereon.

The foraminous sleeve may be configured to convey combustion materials to the foraminous axial surface for combustion thereon. Accordingly, the combustion materials may combust on the foraminous axial surface to maintain the temperature and help prevent the accumulation of particulates, powder or condensate in this region.

The outer sleeve may fail to extend to the foraminous axial surface to expose or reveal at least a radially outer edge of the foraminous axial surface to support combustion thereon. Accordingly, combustion may occur on an outer surface of the foraminous sleeve, facing towards the wetted sleeve and help prevent the accumulation of particulates, powder or condensate in this region.

The wetted sleeve may be housed within a wetted sleeve housing. The foraminous axial surface may be positioned at least flush with an upstream surface of the wetted sleeve housing. Hence, the foraminous axial surface may be positioned at or downstream of the upstream surface of the wetted sleeve housing.

The upstream surface may have a deflecting lip depending or extending from the upstream surface. The foraminous axial surface may be positioned at least flush with an edge of the deflected lip.

The foraminous sleeve may be positioned to extend within the wetted sleeve to position the foraminous axial surface below the upstream surface.

The wetted sleeve may surround at least a portion of the foraminous sleeve concentrically.

The abatement apparatus may comprise a purge conduit configured or arranged to deliver or convey a purge gas to an exposed radial outer surface of the foraminous sleeve extending within the wetted sleeve. Accordingly, that portion of the foraminous sleeve extending within the wetted sleeve may be purged with a purge gas to further help prevent the accumulation of particulates, powder or condensates in this region.

The abatement apparatus may comprise a plurality of upstands configured to extend to at least the foraminous axial surface. This helps to protect the foraminous axial surface from damage during assembly of the abatement apparatus.

According to a second aspect, there is provided a method comprising: defining an upstream portion of a combustion chamber for treating an effluent stream with a foraminous sleeve; defining a downstream portion of the combustion chamber with a wetted sleeve fluidly coupled with the foraminous sleeve; and configuring the foraminous sleeve to provide a foraminous axial surface facing downstream towards the downstream portion of the combustion chamber.

The method may comprise orientating the foraminous axial surface to be orthogonal to the wetted sleeve.

The method may comprise forming the foraminous sleeve with at least one inward-facing surface defining the upstream portion of the combustion chamber and at least partially defining an upstream portion outlet with the foraminous axial surface.

The method may comprise orientating at least a portion of the foraminous axial surface to be orthogonal to the inward-facing surface.

The method may comprise orientating the inward-facing surface to be generally parallel to a major direction of flow of the effluent stream in the combustion chamber and orientating at least a portion of the foraminous axial surface to be generally orthogonal to the major direction of flow of the effluent stream.

The method may comprise forming a lofted transition between the inward-facing surface and the foraminous axial surface.

The method may comprise forming the foraminous axial surface to be at least one of planar and curved.

The method may comprise forming the combustion chamber to be tubular.

The method may comprise forming the combustion chamber to be cylindrical and the foraminous axial surface to be annular.

The method may comprise forming the combustion chamber to be cuboid and the foraminous axial surface to be an annular quadrilateral.

The method may comprise at least partially housing the foraminous sleeve within a radially outer sleeve extending at least partially along an axial length of the foraminous sleeve to define a plenum for delivery of combustion materials to be conveyed through the foraminous sleeve for combustion thereon.

The method may comprise configuring the foraminous sleeve to convey combustion materials to the foraminous axial surface for combustion thereon.

The method may comprise configuring the outer sleeve to fail to extend to the foraminous axial surface to expose at least a radially outer edge of the foraminous axial surface to support combustion thereon.

The method may comprise configuring the outer sleeve to fail to extend to the foraminous axial surface to expose a radially outer ring of the foraminous axial surface to support combustion thereon.

The method may comprise housing the wetted sleeve within a wetted sleeve housing and positioning the foraminous axial surface to be at least flush with an upstream surface of the wetted sleeve housing.

The method may comprise forming the upstream surface with a deflecting lip depending from the upstream surface and positioning the foraminous axial surface to be at least flush with an edge of the deflecting lip.

The method may comprise positioning the foraminous sleeve to extend within the wetted sleeve to position the foraminous axial surface below the upstream surface.

The method may comprise surrounding at least a portion of the foraminous sleeve concentrically with the wetted sleeve.

The method may comprise configuring a purge conduit to deliver a purge gas to an exposed radial outer surface of the foraminous sleeve extending within the wetted sleeve.

The method may comprise configuring a plurality of upstands to extend to at least the foraminous axial surface.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing embodiments in any more detail, first an overview will be provided. Some embodiments provide a combustion chamber for an abatement apparatus which is at least partially formed by a foraminous sleeve which has an inward-facing surface which supports combustion of combustion reagents in order to heat the combustion chamber for treatment of an effluent stream. In addition to the inward-facing surface, the foraminous sleeve has an at least partially axial facing surface which also supports combustion thereon, in order to provide heat and provide a purge flow in the vicinity of an axial exhaust region of the foraminous sleeve which prevents excessive cooling of the foraminous sleeve in this region to reduce the accumulation of particulates, powder or condensates on the foraminous sleeve, which may otherwise affect the performance of the abatement apparatus and/or cause bridging or blockages. In some embodiments, the foraminous sleeve extends into a downstream wetted sleeve and at least that portion of a radially outer surface of the foraminous sleeve which faces the wetted sleeve is exposed to support combustion thereon. This again helps to provide heat which prevents excessive cooling of the foraminous sleeve in this region prevent the accumulation of particulates, powder or condensates which may otherwise bridge across to the wetted sleeve, potentially causing blockages. In some embodiments, the inward-facing surface of the foraminous sleeve transitions to the axial surface facing downstream continuously in order to provide continuous heating in this region and avoid any sharp transitions which may otherwise encourage accumulation of particulates, powder or condensates.

Abatement Apparatus—1st Arrangement

Figure 1:
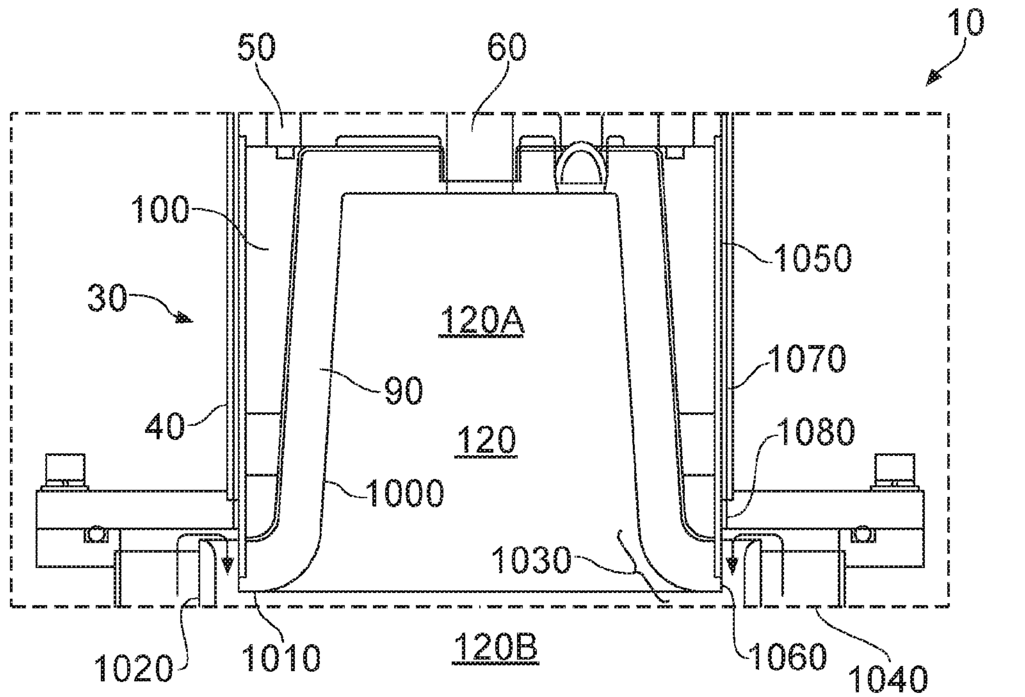
FIG. 1 illustrates a sectional view of a portion of an abatement apparatus according to one embodiment.

FIG. 1 illustrates a portion of an abatement apparatus 10 according to one embodiment. Other components of the abatement apparatus have been omitted to improve clarity. A combustion chamber module 30 is provided which comprises a housing 40 which houses a foraminous sleeve 90, which defines an upstream portion 120A of a combustion chamber 120. In this arrangement, the foraminous sleeve 90 is a tapering cuboid, but other shape sleeves are possible. An inlet nozzle 60 is provided upstream of the combustion chamber 120 which provides an effluent stream to be treated. The inlet nozzle 60 extends into the housing 40, through an upstream surface of the foraminous sleeve 90.

Downstream of the foraminous sleeve 90 is provided a wetted wall 1020 of a weir which defines a downstream portion 120B of the combustion chamber 120. The wetted wall 1020 is positioned generally downstream of, and concentric to, the foraminous sleeve 90. Fluid, such as water, is provided from an outer jacket 1040 and spills over and flows down an inward-facing surface of the wetted wall 1020.

A plenum 100 is defined between an outer surface of the foraminous sleeve 90 and an inner surface of an outer sleeve 1050 housed within the housing 40. Upstream of the plenum 100 is provided a combustion reagent inlet 50 which conveys combustion reagents into the plenum 100. The plenum 100 feeds the combustion reagents through the foraminous sleeve 90 for combustion on an inward-facing surface 1000 of the foraminous sleeve 90 defining the upper portion 120A of the combustion chamber 120. As well as combustion occurring on the inward-facing surface 1000 of the foraminous sleeve 90, combustion also occurs on an axial surface 1010 of the foraminous sleeve, which faces downstream, towards the downstream portion 120B of the combustion chamber 120 which is defined by the wetted sleeve 1020. In addition, a curved surface 1030 of the foraminous sleeve 90 provides a transition between the inward-facing surface 1000 and the axial surface 1010 which also supports combustion thereon. Hence, combustion not only occurs on the inward-facing surface 1000 but also occurs on the axial surface 1010 and on the curved surface 1030. This provides for enhanced heating at the exhaust or discharge region of the upstream portion 120A of the combustion chamber 120 which would otherwise be cooled by the wetted wall 1020 and which would otherwise result in accumulation of particulates, powder or condensate in this region.

In addition, the outer sleeve 1050 extends towards the axial face 1010 but stops short of the axial face 1010 to expose a radially outer surface 1060 which faces towards the wetted wall 1020 and which supports the combustion of combustion reagents thereon. Again, this helps to prevent the accumulation of particulates, powder or condensate on this surface which would otherwise grow or bridge towards the wetted wall 1020.

Between the housing 40 and the outer wall 1050 is provided a further plenum 1070 which is fed with a purge gas which exits through an annular purge gas outlet 1080 to shroud the outer facing surface of the discharge end of the combustion chamber module 30 to also help prevent the accumulation of particulates, powder or condensates thereon.

Abatement Apparatus—2nd Arrangement

Figure 2:
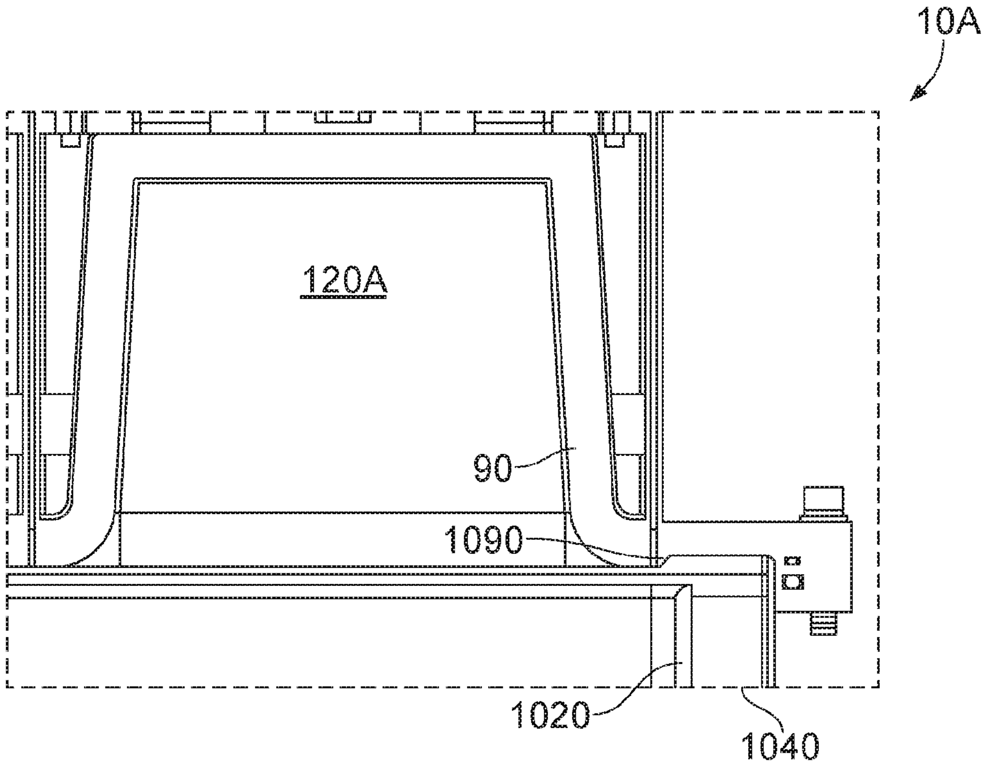
FIG. 2 illustrates a sectional view of an abatement apparatus according to one embodiment.

FIG. 2 illustrates an abatement apparatus 10A according to one embodiment. This embodiment is similar to that described in FIG. 1 above but has the upstream portion 120A of the combustion chamber 120 positioned further upstream of the wetted wall 1020 such that the foraminous sleeve 90 is positioned completely upstream of the wetted wall 1020. In this embodiment, the ceiling of the outer jacket 1040 has a downwardly tapering protrusion 1090 which helps to deflect any fluid away from the foraminous wall 90.

Foraminous Sleeve—$2^{nd}$ Arrangement

Figure 3:
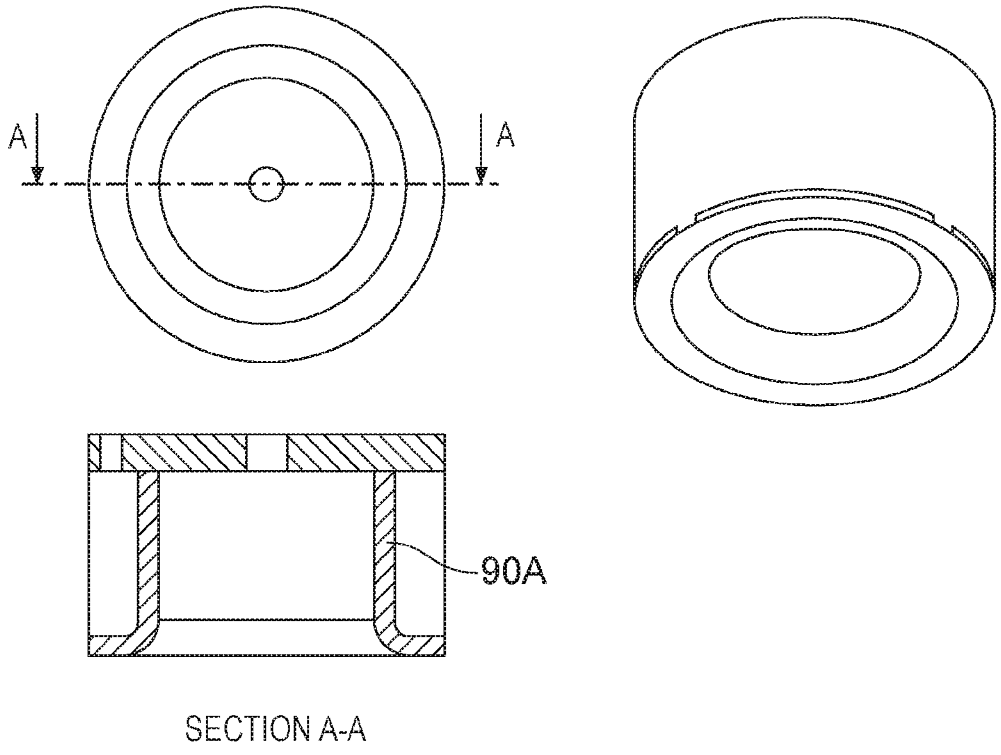
FIGS. 3 and 4 illustrate a foraminous sleeve according to one embodiment.

FIG. 3 illustrates a foraminous sleeve 90A according to one embodiment. In this embodiment, the foraminous sleeve 90A is cylindrical, rather than a cuboid shape as illustrated in FIGS. 1 and 2.

Figure 4:
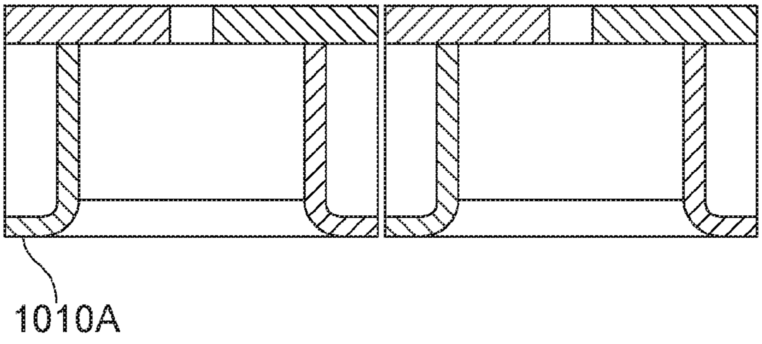

As can be seen in FIG. 4, a pair of foraminous sleeves 90A can be co-located and each has an axial surface 1010A orientated downstream towards a downstream portion of its combustion chamber.

Hence, some embodiments provide an improved plenum/weir or wetted wall construction to address liner or foraminous sleeve wetting and solids deposition issues at the base of the burner. A rectangular burner element or foraminous sleeve is constructed with bell-mouth form, that is to say at the discharge end of the foraminous material that supports combustion is formed around the trailing edge to give both radial and axial firing surfaces. The slender, high velocity plenum minimises footprint. This slender plenum extends down into the weir or wetted wall section; the over-flowing water surface starts a significant distance upstream of the axial firing surface with a minimal radial clearance between the burner and the weir. This area may be fed with a trickle purge or air or nitrogen to avoid stagnancy. The burner or foraminous sleeve may have parallel walls. It may have tapered walls, preferably increasing in diameter from the inlet to the outlet. The taper half-angle is preferably between say 2 to 5 degrees, more preferably say 3 to 3.5 degrees. The burner may be constructed as an un-sintered accretion of metal and ceramic fibres cast against a perforated former. The extension of the burner lip into the weir section effectively obscures the burner-weir interface from any powder emanating from the combustor. This prevents the accumulation of solid at the interface and subsequent damage to the liner arising from water transport across the deposit. Some embodiments provide the feature that the gas/air plenum is enclosed at the bottom by the foraminous material, thus removing the necessity for a lower sealing surface. This some embodiments provide improvements to mean time between service and reduces the cost burden of burner liner replacement.

Some embodiments provide a surface burner or foraminous sleeve with substantially inward facing walls which has a section at the outlet of the burner to transition the burner surface from a radial to an axial flow direction. This improves performance at the outlet section of the burner by removing non-purged surfaces like gaskets and flanges. For multiple burner systems this allows for reliable cross ignition and improves packing density.

Some embodiments provide a cylindrical inward fired burner or foraminous sleeve. Fuel and air are introduced to an inlet where it propagates through cylindrical plenum area. This plenum is surrounded on the outside by a non-permeable burner wall and on the inside by a permeable burner material. Fuel and air will travel through the burner wall and combust in combustion chamber area. The flow direction in this area will be radial. The burner top ensures that burner gases only exit downward. Further down the burner, the burner section transitions the burner material from a substantially radial, inward facing burner to an axial facing burner. One burner section is entirely axial facing. This causes flow fields in those combustion chamber areas to transition from a radial to an axial direction. It is possible to protect the outward facing burner surface with standoffs. These can be extensions of burner wall but do not have to be. The standoffs extend to the edge of burner material. This protects the material from accidental contact during handling and allows it to be placed on a flat surface. It is not necessary for standoffs to extend all around the perimeter of the burner. It is beneficial to have areas, which have no standoff. These areas can be covered by burner material, which is the edge of burner surface. This reduces the non-purged area in the combustion zone, which reduces solid deposition and burner corrosion.

In some embodiments a process gas can be introduced into an inlet. The process gas will travel downward, contacting the gases from the burner material. A transitional zone and an axial flow zone will ensure the process gases stay in the centre of the burner and prevent deposition of solid materials onto the burner surface.

In some embodiments, the same cylindrical burner, as stated above, is placed side by side with an identical burner for use in a multiple burner system. These burners share combustion space. Burner sections are directly next to each other allowing for immediate and reliable ignition from one burner to another. This helps to reduce the number of pilot burners required in a multiple burner system. The axial surface also optimizes the interface between the two burners by removing non-purged surfaces which would normally be required at this interface. This reduces the agglomeration of the solid particles, increasing burner life and efficacy.

Hence, it can be seen that some embodiments helps to improve performance at the outlet of the burner by removing non-purged surfaces like gaskets and flanges; allow for reliable ignition between different burner modules in a multiple burner system; improve packing density of burner modules in a multiple burner system by removing gaskets and flanges from the outlet of the burner; and provide an axial facing burner surface at the trailing edge of an inward fired burner.

It will be appreciated that the burner shape can vary; standoffs at the base of the burner can be included to prevent damage to the outward facing burner section; the burner transition section can vary in shape and scale; the ratio of radial facing burner surface to axial facing burner surface can vary.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An abatement apparatus for abatement of an effluent stream from a semiconductor processing tool, comprising:

a combustion chamber formed by a foraminous sleeve defining an upstream portion of said combustion chamber for treating said effluent stream, said upstream portion of said combustion chamber having an inlet for receiving said effluent stream, wherein said foraminous sleeve is at least partially housed within a radially outer sleeve extending partially along an axial length of said foraminous sleeve to define a plenum for delivery of combustion materials to be conveyed through said foraminous sleeve for combustion thereon, and a wetted sleeve fluidly coupled with said foraminous sleeve, said wetted sleeve defining a downstream portion of said combustion chamber, wherein said foraminous sleeve is configured to provide a foraminous axial surface facing downstream towards said downstream portion of said combustion chamber;

wherein said outer sleeve fails to extend to the foraminous axial surface to expose a radially-facing surface at a location where the foraminous sleeve terminates so as to support combustion on the radially-facing surface.

2. The abatement apparatus of claim 1, wherein said foraminous axial surface is orthogonal to said wetted sleeve.

3. The abatement apparatus of claim 1, wherein said foraminous sleeve has at least one inward-facing surface defining said upstream portion of said combustion chamber and said foraminous axial surface at least partially defines an upstream portion outlet.

4. The abatement apparatus of claim 3, wherein at least a portion of said foraminous axial surface is orthogonal to said inward-facing surface.

5. The abatement apparatus of claim 3, wherein said inward-facing surface is orientated to be generally parallel to a major direction of flow of said effluent stream in said combustion chamber and at least a portion of said foraminous axial surface is orientated to be generally orthogonal to said major direction of flow of said effluent stream.

6. The abatement apparatus of claim 1, wherein said foraminous axial surface is at least one of planar and curved.

7. The abatement apparatus of claim 1, wherein said combustion chamber is tubular.

8. The abatement apparatus of claim 1, wherein said combustion chamber is one of cylindrical and cuboid and said foraminous axial surface is one of annular and an annular quadrilateral.

9. The abatement apparatus of claim 1, wherein said outer sleeve fails to extend to said foraminous axial surface to expose a radially outer ring of said foraminous axial surface to support combustion thereon.

10. The abatement apparatus of claim 1, wherein said wetted sleeve is housed within a wetted sleeve housing and said foraminous axial surface is positioned at least flush with an upstream surface of said wetted sleeve housing.

11. The abatement apparatus of claim 10, wherein said upstream surface has a deflecting lip depending from said upstream surface and said foraminous axial surface is positioned at least flush with an edge of said deflecting lip.

12. The abatement apparatus of claim 10, wherein said foraminous sleeve is positioned to extend within said wetted sleeve to position said foraminous axial surface below said upstream surface.

13. The abatement apparatus of claim 1, comprising a purge conduit configured to deliver a purge gas to an exposed radial outer surface of said foraminous sleeve extending within said wetted sleeve.

14. The abatement apparatus of claim 1, comprising a plurality of upstands configured to extend to at least said foraminous axial surface.

15. A method comprising:

defining an upstream portion of a combustion chamber for treating an effluent stream with a foraminous sleeve;

defining a downstream portion of said combustion chamber with a wetted sleeve fluidly coupled with said foraminous sleeve; and configuring said foraminous sleeve to provide a foraminous axial surface facing downstream towards said downstream portion of said combustion chamber such that said foraminous sleeve is at least partially housed within a radially outer sleeve extending partially along an axial length of said foraminous sleeve to define a plenum for delivery of combustion materials to be conveyed through said foraminous sleeve for combustion thereon and said outer sleeve fails to extend to the foraminous axial surface to expose a radially-facing surface at a location where the foraminous sleeve terminates so as to support combustion on the radially-facing surface.

* * * * *